United States Patent
Kline et al.

(10) Patent No.: US 11,079,996 B2
(45) Date of Patent: Aug. 3, 2021

(54) CELLULAR DISPLAY DEVICE

(71) Applicant: INTERNATIONAL BUSINESS MACHINES CORPORATION, Armonk, NY (US)

(72) Inventors: Eric V. Kline, Rochester, MN (US); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/361,266

(22) Filed: Mar. 22, 2019

(65) Prior Publication Data

US 2020/0301642 A1 Sep. 24, 2020

(51) Int. Cl.
*G06F 3/14* (2006.01)

(52) U.S. Cl.
CPC .................. *G06F 3/1446* (2013.01)

(58) Field of Classification Search
CPC ............ G06F 3/1446; G09G 2300/026; G09G 2380/02; G09G 3/003; G09G 2320/0261; G09G 2320/028; H04N 13/239; H04N 13/359; H04N 13/261; H04N 13/128; H04N 2213/008; H04N 5/23296

See application file for complete search history.

(56) References Cited

U.S. PATENT DOCUMENTS

| | | | | |
|---|---|---|---|---|
| 2006/0219856 | A1* | 10/2006 | Oh | F16M 11/18 248/274.1 |
| 2012/0056056 | A1* | 3/2012 | Lee | F16M 11/18 248/284.1 |
| 2012/0075166 | A1* | 3/2012 | Marti | G06F 3/011 345/1.1 |
| 2012/0206473 | A1 | 8/2012 | Beardsley et al. | |
| 2013/0328777 | A1* | 12/2013 | Johnson | H04N 13/356 345/161 |
| 2015/0145755 | A1* | 5/2015 | Yamazaki | H01L 51/5237 345/76 |
| 2015/0242044 | A1* | 8/2015 | Nam | H04N 13/349 345/173 |
| 2016/0191680 | A1* | 6/2016 | Jung | H04M 1/0241 455/575.1 |
| 2016/0210103 | A1* | 7/2016 | Yoshizumi | H01L 51/0097 |
| 2017/0180672 | A1 | 6/2017 | Lee et al. | |
| 2018/0220537 | A1* | 8/2018 | Heo | G09F 9/3026 |
| 2020/0004297 | A1* | 1/2020 | Rekapalli | G06F 1/1652 |

OTHER PUBLICATIONS

Le Goc, Mathieu et al. "Zooids: Building Blocks for Swarm User Interfaces" Proceedings of the 29th Annual Symposium on User Interface Software and Technology (pp. 97-109), ACM.

(Continued)

*Primary Examiner* — Dong Hui Liang
(74) *Attorney, Agent, or Firm* — Cantor Colburn LLP; Tihon Poltavets

(57) ABSTRACT

A cellular display and method and computer program products for operating the same are provided. Aspects include analyzing a content item to be displayed by the cellular display. Aspects also include adjusting a position of one or more of the plurality of display devices based on the analysis of the content item. Aspects further include displaying the content item on at least one of the display devices.

15 Claims, 4 Drawing Sheets

(56) References Cited

OTHER PUBLICATIONS

Busser, Maximilian and Friends "A Parallel World—Disney Creates Tiny, Mobile Robots Using Cues from Insect Behaviour"; Retrieved at: https://www.mbandf.com/en/parallel-world/disney-creates-tiny-mobile-robots-using-cues-from-insect-behaviour; Science & Technology; dated Sep. 8, 2014; 10 pgs.
Wikipedia "Swarm Robotics", retrieved at: https://en.wikipedia.org/wiki/Swarm_robotics; downloaded May 27, 2020; 3 pgs.

\* cited by examiner

CELLULAR DISPLAY DEVICE

BACKGROUND

The present invention generally relates to display devices, and more specifically, to a cellular display device.

Many different types of display devices are currently commercially available. One common display device is a multi-screen display device, which is a display device that combines multiple screens to display a single content item. Multi-screen display devices include two or more individual display devices that are placed together to create a larger display device. In currently commercially available multi-screen displays, a user must manually adjust the display devices to create a desired configuration of the multi-screen display.

SUMMARY

Embodiments of the present invention are directed to a computer-implemented method for operating a cellular display. A non-limiting example of the computer-implemented method includes analyzing, by a processor, a content item to be displayed by the cellular display. The method also includes adjusting, by the processor, a position of one or more of the plurality of display devices based on the analysis of the content item. The method further includes displaying the content item on at least one of the display devices.

Embodiments of the present invention are directed to a cellular display. The cellular display having a processing system and a display panel in communication with the processing system. The display panel includes a plurality of display devices, a back panel, and a plurality of actuators coupled to the back panel, wherein each of the plurality actuators are coupled to one of the plurality of display devices and are configured to move the one of the plurality of display devices relative to the back panel.

Embodiments of the invention are directed to a computer program product for operating a cellular display, the computer program product comprising a computer readable storage medium having program instructions embodied therewith. The program instructions are executable by a processor to cause the processor to perform a method. A non-limiting example of the method includes analyzing a content item to be displayed by the cellular display. The method also includes adjusting a position of one or more of the plurality of display devices based on the analysis of the content item. The method further includes displaying the content item on at least one of the display devices.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
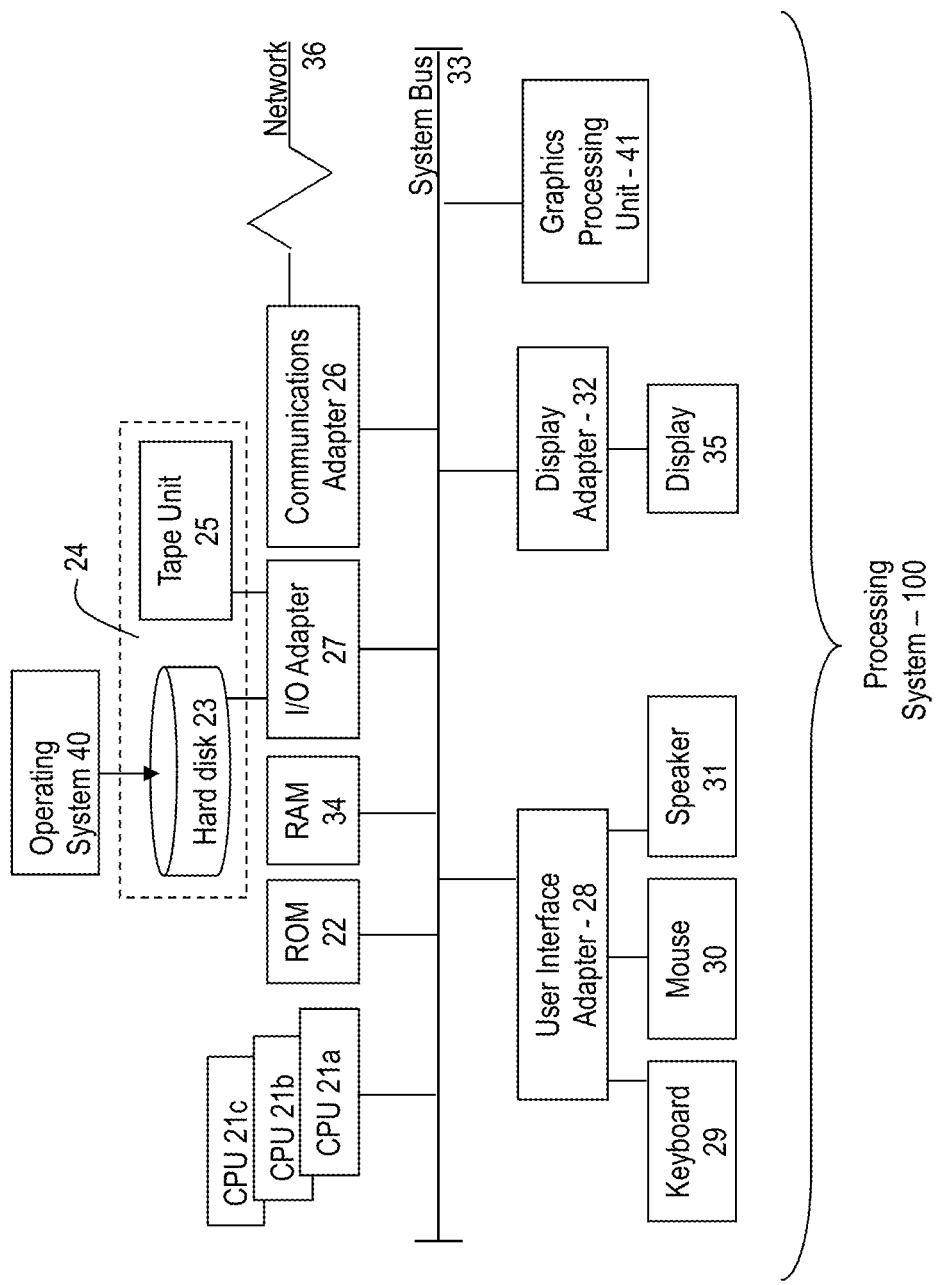
FIG. 1 depicts a block diagram of a computer system for use in implementing one or more embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Referring to FIG. 1, there is shown an embodiment of a processing system 100 for implementing the teachings herein. In this embodiment, the system 100 has one or more central processing units (processors) 21a, 21b, 21c, etc. (collectively or generically referred to as processor(s) 21). In one or more embodiments, each processor 21 may include a reduced instruction set computer (RISC) microprocessor. Processors 21 are coupled to system memory 34 and various other components via a system bus 33. Read only memory (ROM) 22 is coupled to the system bus 33 and may include a basic input/output system (BIOS), which controls certain basic functions of system 100.

FIG. 1 further depicts an input/output (I/O) adapter 27 and a network adapter 26 coupled to the system bus 33. I/O adapter 27 may be a small computer system interface (SCSI) adapter that communicates with a hard disk 23 and/or tape storage drive 25 or any other similar component. I/O adapter 27, hard disk 23, and tape storage device 25 are collectively referred to herein as mass storage 24. Operating system 40 for execution on the processing system 100 may be stored in mass storage 24. A network adapter 26 interconnects bus 33 with an outside network 36 enabling data processing system 100 to communicate with other such systems. A screen (e.g., a display monitor) 35 is connected to system bus 33 by display adaptor 32, which may include a graphics adapter to improve the performance of graphics intensive applications and a video controller. In one embodiment, adapters 27, 26, and 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 all interconnected to bus 33 via user interface adapter 28, which may include, for example, a Super I/O chip integrating multiple device adapters into a single integrated circuit.

In exemplary embodiments, the processing system 100 includes a graphics processing unit 41. Graphics processing unit 41 is a specialized electronic circuit designed to manipulate and alter memory to accelerate the creation of images in a frame buffer intended for output to a display. In general, graphics processing unit 41 is very efficient at manipulating computer graphics and image processing and has a highly parallel structure that makes it more effective than general-purpose CPUs for algorithms where processing of large blocks of data is done in parallel.

Thus, as configured in FIG. 1, the system 100 includes processing capability in the form of processors 21, storage capability including system memory 34 and mass storage 24, input means such as keyboard 29 and mouse 30, and output capability including speaker 31 and display 35. In one embodiment, a portion of system memory 34 and mass storage 24 collectively store an operating system coordinate the functions of the various components shown in FIG. 1.

In exemplary embodiments, a cellular display that includes a plurality of display devices arranged in a matrix is provided. The position of each of the plurality of display devices is configured to be individually controlled. In exemplary embodiments, a processing system that operates the cellular display is configured to analyze a content item being displayed by the cellular display and to dynamically change the position and angle of the plurality of display devices. The movement of the plurality of display devices creates a concave or convex display surface automatically, accordingly appropriate image can be displayed in the created display surface. While creating the curved display surface, the plurality of display devices are arranged in a required angular fashion so that required curvature can be achieved.

Figure 2:
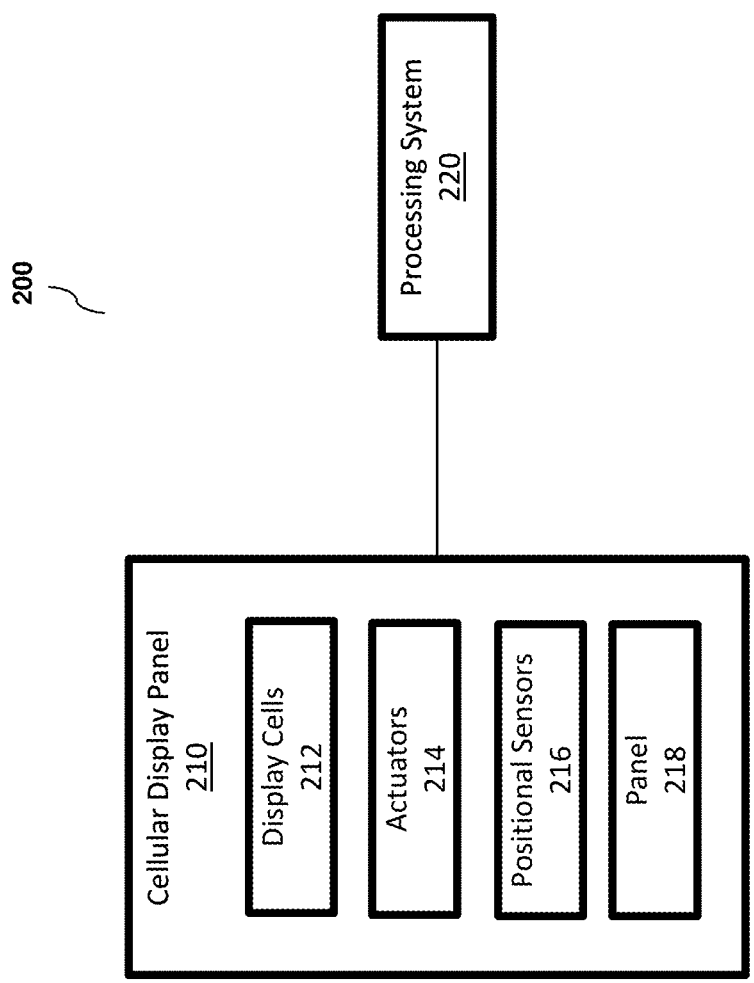
FIG. 2 depicts a block diagram of a cellular display according to one or more embodiments of the present invention.

Referring now to FIG. 2 a block diagram of a cellular display 200 according to one or more embodiments of the present invention is shown. As illustrated, the cellular display 200 includes a cellular display panel 210 that is in communication with a processing system 220. In exemplary embodiments, the processing system 220 is a processing system such as the one shown in FIG. 1. The cellular display panel 210 includes a plurality of display cells 212 that are coupled to a panel 218 via one or more actuators 214. The cellular display panel 210 also includes one or more positional sensors 216 that are configured to measure the distance and/or the angle between a display surface of each display cell 212 and the panel 218.

The processing system 220 is configured to control the operation of the cellular display panel 210. In exemplary embodiments, the processing system 220 is configured to analyze a content item being displayed by the cellular display panel 210 and to dynamically change the position and angle of the plurality of display devices 212. The movement of the plurality of display devices 212 creates a concave and/or convex portions of the display surface that are used to emphasize the movement of objects depicted in the displayed content item.

Figure 3A:
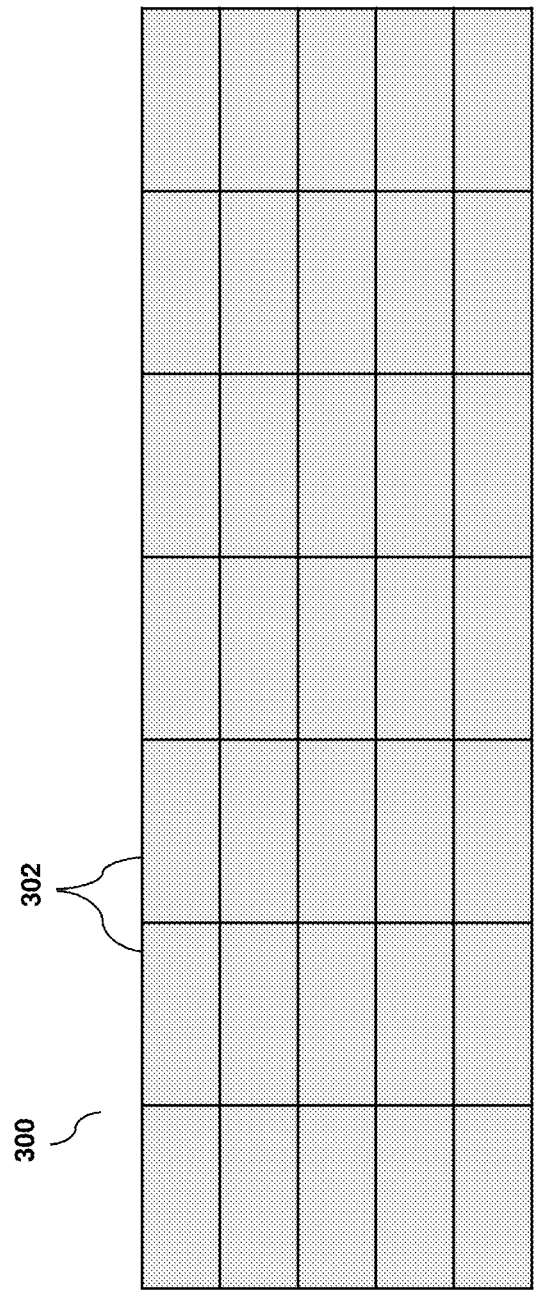
FIG. 3A depicts a front view of a cellular display panel according to one or more embodiments of the invention.
Figure 3C:
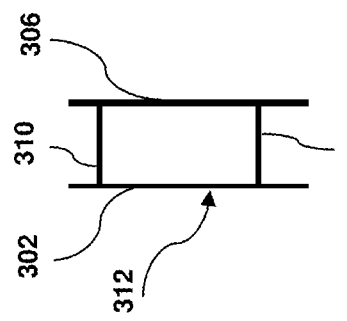
FIG. 3C depicts a cross-sectional view of a portion of the cellular display panel of FIG. 3A according to another embodiment of the invention.
Figure 3B:
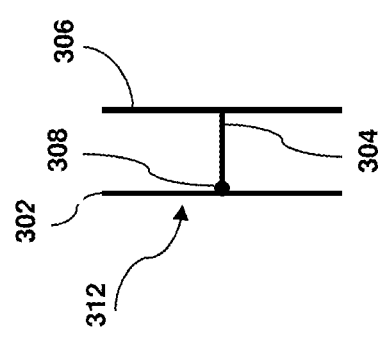
FIG. 3B depicts a cross-sectional view of a portion of the cellular display panel of FIG. 3A according to one embodiment of the invention.

Referring now to FIGS. 3A, 3B, and 3C depict illustrations of a cellular display panel 300 according to one or more embodiments of the invention are shown. As shown the cellular display panel 300 includes a plurality of display devices 302 that are coupled to a panel 306. Each of the plurality of display devices 302 includes a display surface 312, which is disposed on an opposite side of the display device from the panel 306. The edges of each display device 302 are configured to abut the adjacent edges of adjacent display devices such that the display surface of the cellular display panel 300 does not include any gaps or discontinuities.

In the embodiment, as best shown in FIG. 3B, a display device 302 is coupled to the panel 306 via an actuator that includes a telescoping arm 304 configured to adjust the distance between display device 302 and the panel 306. The actuator that includes a pivoting joint 308 that is configured to adjust an angle between display surface 312 and the panel 306. In another embodiment, as best shown in FIG. 3C, a display device 302 is coupled to the panel 306 via an actuator that includes multiple telescoping arms 310 that in combination can adjust the distance between display device 302 and the panel 306 and the angle between display surface 312 and the panel 306.

In exemplary embodiments, the plurality of display device 302, are arranged in a matrix configuration. Although the display devices 302 are illustrated as having a rectangular shape, it will be appreciated by those of ordinary skill in the art that the display devices may have various shapes. The number and placement of the actuators that connect the display devices to the panel can be determined based upon the size and shape of the display devices. In exemplary embodiments, the movement of the display devices 302 are coordinated such that the edges of the adjacent display devices 302 abut one another, i.e., the cellular display panel will not include any gaps or discontinuities.

Figure 4:
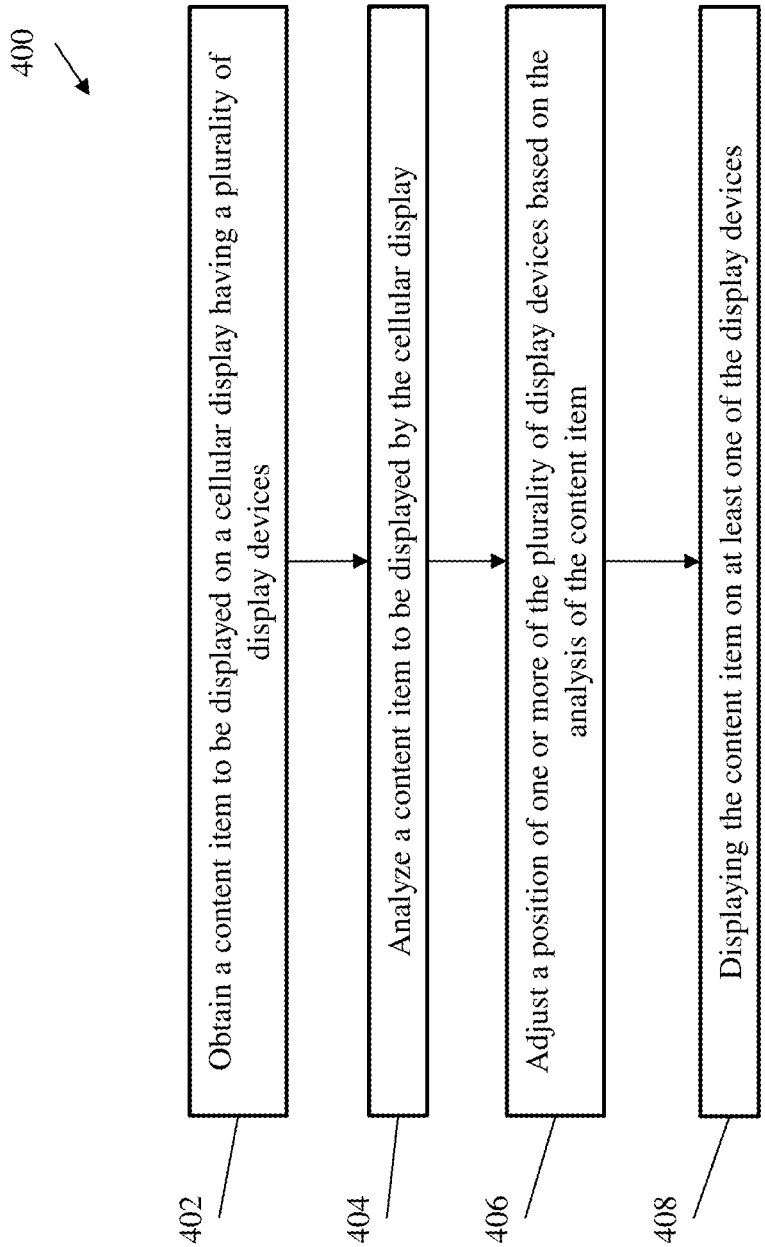
FIG. 4 depicts a flow diagram of a method for operating a cellular display according to one or more embodiments of the invention.

Turning now to FIG. 4, a flow diagram of a method 400 for operating a cellular display in accordance with an embodiment is shown. In one or more embodiments of the present invention, the method 400 may reside on a computer system or processing system, such as the processing system 100 described hereinabove and illustrated in FIG. 1, or in some other type of computing or processing environment.

The method 400 begins at block 402 and includes obtaining a content item to be displayed on a cellular display having a plurality of display devices. Next, as shown at block 404, the method 400 includes analyzing a content item to be displayed by the cellular display. In exemplary embodiments, the content item includes a series of images and the analysis of the content item includes identifying a moving object in the series of images. The method 400 includes adjusting a position of one or more of the plurality of display devices based on the analysis of the content item, as shown at block 406.

In one embodiment, adjusting the position of one or more of the plurality of display devices includes instructing an actuator coupled to at least one of the plurality of display devices to change a distance between a display surface of the one or more of the plurality of display devices and a backing. In one embodiment, adjusting the position of one or more of the plurality of display devices includes instructing an actuator coupled to at least one of the plurality of display devices to change an angle between a display surface of the one or more of the plurality of display devices and a backing. Next, as shown at block 408, the method 400 includes displaying the content item on at least one of the display devices.

In exemplary embodiments, the plurality of display devices are arranged in a matrix and each of the plurality of display devices is coupled to a backing by one or more actuators. The actuators are configured to change a distance between a display surface of display devices and the backing and to change an angle between the display surface of display devices and the backing. In one embodiment, each display device is coupled to the backing by a single actuator that is configured to change both the distance and angle of the display device relative to the backing. In another embodiment, each display device is coupled to the backing by multiple actuators.

In exemplary embodiments, the position of the one or more, of the plurality of display devices are adjusted to emphasize a moving object in the content item. For example, the content item can be a video, or series of images, that includes an animal moving across the screen or flowing water. In this example, the cellular display device analyzes the images and adjusts the position of the one or more display devices to emphasize the movement in the images. For example, in the case of flowing water, the position of the display devices can be adjusted to mimic a wave flowing across the cellular display.

Additional processes may also be included. It should be understood that the processes depicted in FIG. 4 represent an illustration, and that other processes may be added or existing processes may be removed, modified, or rearranged without departing from the scope and spirit of the present disclosure.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for operating a cellular display that includes a plurality of display devices coupled to a backing, the method comprising:
    obtaining, via one or more positional sensors, a distance and an angle between a display surface of each of the plurality of display devices and the backing;
    analyzing, by a processor, a content item to be displayed by the cellular display;
    adjusting, by the processor, a physical position of one or more of the plurality of display devices based on the analysis of the content item, wherein adjusting the physical position of one or more of the plurality of display devices is coordinated such that edges of adjacent display devices continuously abut one another during the adjusting such that the cellular display panel will maintain an abutting relationship and not include any gaps; and
    displaying the content item on at least one of the display devices,
    wherein the plurality of display devices are arranged in a matrix and each of the plurality of display devices is coupled to the backing by an actuator that is configured to control the distance and the angle between the display surface of each the plurality of display devices and the backing.

2. The computer-implemented method of claim 1, wherein adjusting the physical position of one or more of the plurality of display devices includes instructing the actuator to change the distance between the display surface of the one or more of the plurality of display devices and the backing.

3. The computer-implemented method of claim 2, wherein adjusting the physical position of one or more of the plurality of display devices includes instructing the actuator to change the angle between the display surface of the one or more of the plurality of display devices and the backing.

4. The computer-implemented method of claim 1, wherein the content item includes a series of images and wherein the analysis includes identifying a moving object in the series of images.

5. The computer-implemented method of claim 4, wherein the physical position of the one or more of the plurality of display devices are adjusted to emphasize the moving object in the series of images.

6. A computer program product comprising a computer readable storage medium having program instructions embodied therewith the program instructions executable by a computer processor to cause the computer processor to perform a method comprising:

analyzing, by a processor, a content item to be displayed by a cellular display, the cellular display including a plurality of display devices;

adjusting, by the processor, a position of one or more of the plurality of display devices based on the analysis of the content item, wherein adjusting the physical position of one or more of the plurality of display devices is coordinated such that edges of adjacent display devices continuously abut one another during the adjusting such that the cellular display panel will maintain an abutting relationship and not include any gaps; and displaying the content item on at least one of the display devices, wherein the plurality of display devices are arranged in a matrix and each of the plurality of display devices is coupled to a backing by an actuator that is configured to control a distance and an angle between a display surface of each the plurality of display devices and the backing.

7. The computer program product of claim 6, wherein adjusting the position of one or more of the plurality of display devices includes instructing the actuator to change the distance between the display surface of the one or more of the plurality of display devices and the backing.

8. The computer program product of claim 7, wherein adjusting the position of one or more of the plurality of display devices includes instructing the actuator to change the angle between the display surface of the one or more of the plurality of display devices and the backing.

9. The computer program product of claim 6, wherein the content item includes a series of images and wherein the analysis includes identifying a moving object in the series of images.

10. The computer program product of claim 9, wherein the position of the one or more of the plurality of display devices are adjusted to emphasize the moving object in the series of images.

11. A cellular display comprising:

a processing system; and a display panel in communication with the processing system, the display panel comprising:

a plurality of display devices arranged in a matrix;

a back panel;

one or more positional sensors configured to measure a distance and an angle between a display surface of each of the plurality of display devices and the back panel; and a plurality of actuators coupled to the back panel, wherein each of the plurality actuators are coupled to one of the plurality of display devices and are configured to move the one of the plurality of display devices relative to the back panel, wherein the processing system is configured to:

analyze a content item to be displayed by the cellular display;

adjust a position of one or more of the plurality of display devices based on the analysis of the content item, wherein adjusting the physical position of one or more of the plurality of display devices is coordinated such that edges of adjacent display devices continuously abut one another during the adjusting such that the cellular display panel will maintain an abutting relationship and not include any gaps; and display the content item on at least one of the plurality of display devices.

12. The cellular display of claim 11, wherein the content item includes a series of images and wherein the analysis includes identifying a moving object in the series of images.

13. The cellular display of claim 12, wherein the position of the one or more of the plurality of display devices are adjusted to emphasize the moving object in the series of images.

14. The cellular display of claim 11, wherein adjusting the position of one or more of the plurality of display devices includes instructing one of the plurality of actuators to change the distance between the display surface of the one or more of the plurality of display devices and the back panel.

15. The cellular display of claim 11, wherein adjusting the position of one or more of the plurality of display devices includes instructing one of the plurality of actuators to change the angle between the display surface of the one or more of the plurality of display devices and the back panel.

* * * * *